US 8,201,955 B2

(12) United States Patent
Fong

(10) Patent No.: US 8,201,955 B2
(45) Date of Patent: Jun. 19, 2012

(54) PORTABLE PHOTOGRAPHIC DIFFUSER

(75) Inventor: Gary Fong, Seattle, WA (US)

(73) Assignee: Gary Fong Photographic, Inc., Kelowna BC (CA)

(*) Notice: Subject to any disclaimer, the term of this patent is extended or adjusted under 35 U.S.C. 154(b) by 203 days.

(21) Appl. No.: 11/873,359

(22) Filed: Oct. 16, 2007

(65) Prior Publication Data

US 2008/0204883 A1    Aug. 28, 2008

Related U.S. Application Data

(60) Provisional application No. 60/903,124, filed on Feb. 23, 2007.

(51) Int. Cl.
*G03B 15/03* (2006.01)
*G03B 15/06* (2006.01)
*F21V 11/18* (2006.01)
*F21V 17/06* (2006.01)

(52) U.S. Cl. ............ 362/18; 362/16; 362/282; 362/322; 362/356; 362/438

(58) Field of Classification Search .............. 362/16–18, 362/11–15, 305, 319–320, 329, 340, 353, 362/355, 361, 7, 3, 8, 105, 396, 436, 438, 362/581, 277, 282, 321, 322, 356, 357; 396/155, 396/173; 267/158–160
See application file for complete search history.

(56) References Cited

U.S. PATENT DOCUMENTS

| 756,194 A | 3/1904 | Zalinski |
| RE13,158 E * | 10/1910 | Lockwood .................. 362/269 |
| 1,769,993 A | 7/1930 | Gillinder |
| 1,874,086 A | 8/1932 | Dickson |
| 2,235,864 A | 3/1941 | Brennan et al. |
| 2,326,004 A * | 8/1943 | Barrett ......................... 359/359 |
| 2,747,076 A | 5/1956 | Eloranta |
| 2,879,377 A | 3/1959 | Layng |
| 3,140,055 A * | 7/1964 | Long .............................. 362/223 |
| 3,191,022 A | 6/1965 | Wince |
| 3,855,602 A | 12/1974 | Hoos |
| 3,877,688 A * | 4/1975 | McCarty ....................... 267/159 |
| 4,066,885 A | 1/1978 | Weinberg |
| 4,075,472 A | 2/1978 | Higuchi |
| 4,084,168 A | 4/1978 | Pizzuti et al. |

(Continued)

FOREIGN PATENT DOCUMENTS

JP     10260457 A    9/1998

OTHER PUBLICATIONS

Internet: http://www/lumiquest.com/; LumiQuest The World Leader in Flash Accessories for Digital & Film; © 2005 LumiQuest; 1 sheet.

(Continued)

*Primary Examiner* — Alan Cariaso
(74) *Attorney, Agent, or Firm* — Christie, Parker & Hale, LLP

(57) ABSTRACT

A photographic light diffusing device is provided. A cowl is adapted to be mounted on a photographic light source, the cowl including an opening through which the photographic light source is visible when the cowl is mounted on the photographic light source. The cowl may also include at least one movable flap and a filter slot for a gel filter.

9 Claims, 14 Drawing Sheets

U.S. PATENT DOCUMENTS

| | | | |
|---|---|---|---|
| 4,091,402 A | 5/1978 | Siegel | |
| 4,091,444 A | 5/1978 | Mori | |
| 4,109,301 A | 8/1978 | Wakimura | |
| D249,798 S * | 10/1978 | Tureck et al. | D16/239 |
| 4,146,918 A | 3/1979 | Tureck | |
| 4,175,279 A | 11/1979 | Asaki | |
| 4,190,880 A | 2/1980 | Esaki | |
| 4,251,854 A | 2/1981 | Kaneko et al. | |
| 4,276,579 A | 6/1981 | Yako | |
| 4,314,280 A * | 2/1982 | Rose | 348/842 |
| 4,333,127 A | 6/1982 | Alkema et al. | |
| 4,388,679 A * | 6/1983 | Blaisdell et al. | 362/306 |
| 4,446,506 A | 5/1984 | Larson | |
| 4,479,173 A | 10/1984 | Rumpakis | |
| 4,539,624 A | 9/1985 | Stone | |
| 4,562,521 A | 12/1985 | Noguchi | |
| 4,594,645 A | 6/1986 | Terashita | |
| 4,610,525 A | 9/1986 | Yoshida et al. | |
| 4,633,374 A | 12/1986 | Waltz et al. | |
| 4,669,031 A | 5/1987 | Regester | |
| 4,710,012 A | 12/1987 | Yamada | |
| 4,757,425 A | 7/1988 | Waltz | |
| 4,807,089 A | 2/1989 | Nussli | |
| D312,471 S | 11/1990 | Couch | |
| 5,095,325 A | 3/1992 | Carstens | |
| 5,154,503 A | 10/1992 | Sternsher | |
| D342,273 S * | 12/1993 | Couch | D16/237 |
| 5,311,409 A * | 5/1994 | King | 362/17 |
| 5,418,694 A * | 5/1995 | Weigert | 362/18 |
| D373,132 S * | 8/1996 | Baillie-Hamilton et al. | D16/237 |
| 5,556,186 A | 9/1996 | Pilby | |
| 5,560,707 A | 10/1996 | Neer | |
| 5,778,264 A * | 7/1998 | Kean | 396/174 |
| 5,839,006 A | 11/1998 | Beckerman | |
| 6,010,234 A | 1/2000 | Rahn | |
| 6,056,422 A * | 5/2000 | Huang | 362/391 |
| 6,102,547 A | 8/2000 | Matsuoto et al. | |
| 6,361,192 B1 | 3/2002 | Fussell et al. | |
| 6,502,962 B1 | 1/2003 | Menke et al. | |
| 6,513,955 B1 * | 2/2003 | Waltz | 362/352 |
| 6,709,121 B1 | 3/2004 | Lowe et al. | |
| D488,181 S | 4/2004 | Masano et al. | |
| 6,953,259 B2 * | 10/2005 | Parsons et al. | 362/191 |
| 6,981,785 B1 | 1/2006 | Watchulonis | |
| 7,360,909 B1 * | 4/2008 | Hughes | 362/18 |
| 7,677,757 B2 * | 3/2010 | Takata et al. | 362/225 |
| 8,113,673 B2 * | 2/2012 | Fong | 362/16 |
| 2004/0190298 A1 * | 9/2004 | Sirichai et al. | 362/387 |
| 2006/0007666 A1 * | 1/2006 | Cook | 362/16 |
| 2006/0109640 A1 * | 5/2006 | Fong | 362/16 |
| 2007/0153501 A1 * | 7/2007 | Kinsman et al. | 362/105 |

OTHER PUBLICATIONS

Internet: http://www.stofen.com/;STO-FEN Products; 1 sheet.
Product Pamphlet: Stroboframe Flash Brackets and accessories; © 1992; 16 sheets.
Product Pamphlet: LumiQuest Photographic Accessories; 3 sheets.
Magazine Article: Sint, S., "Sint's View", Popular Photography, Feb. 1996, 3 sheets.
Internet: http://dembflashdiffusers.com/; Demb Flash Diffuser Pro, 2 sheets, © 2006.

* cited by examiner

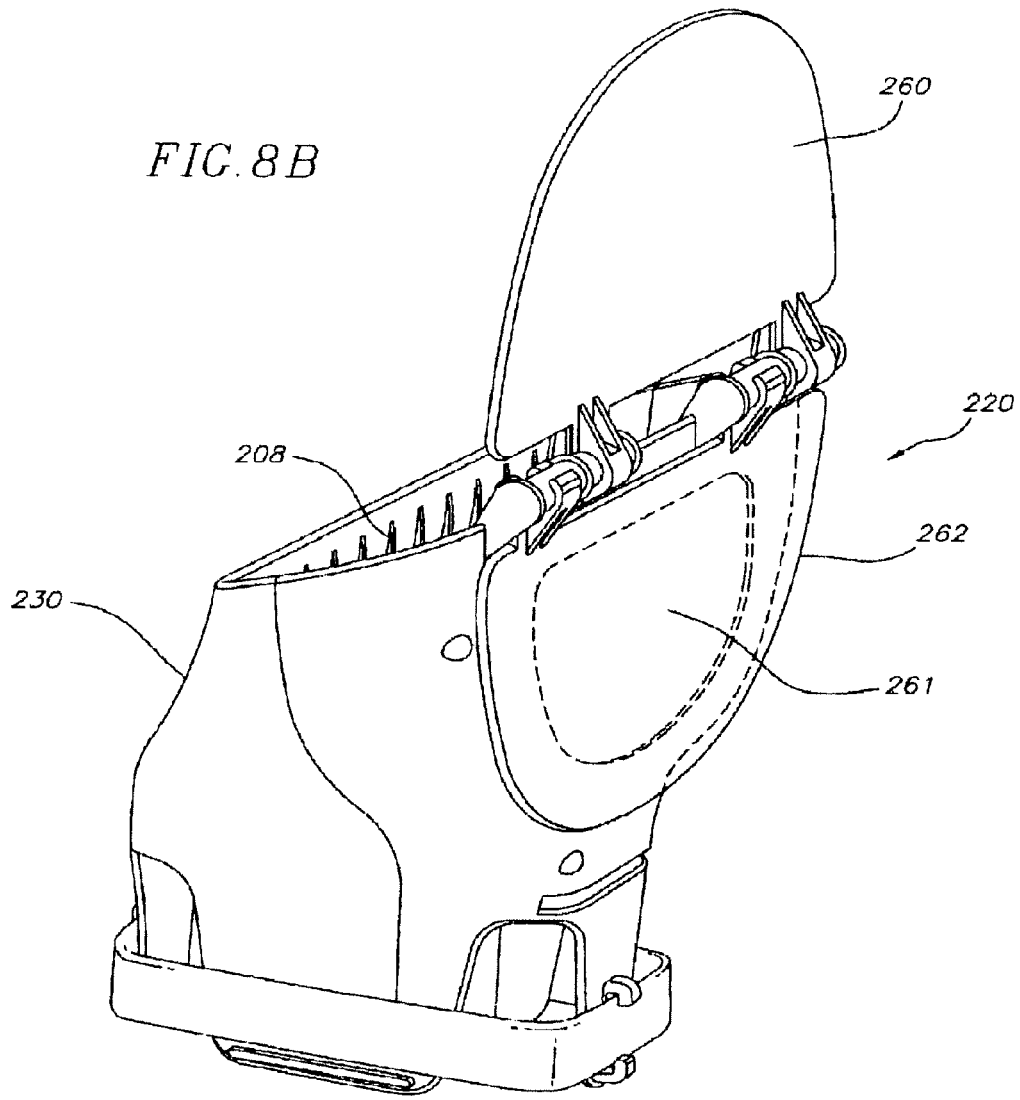

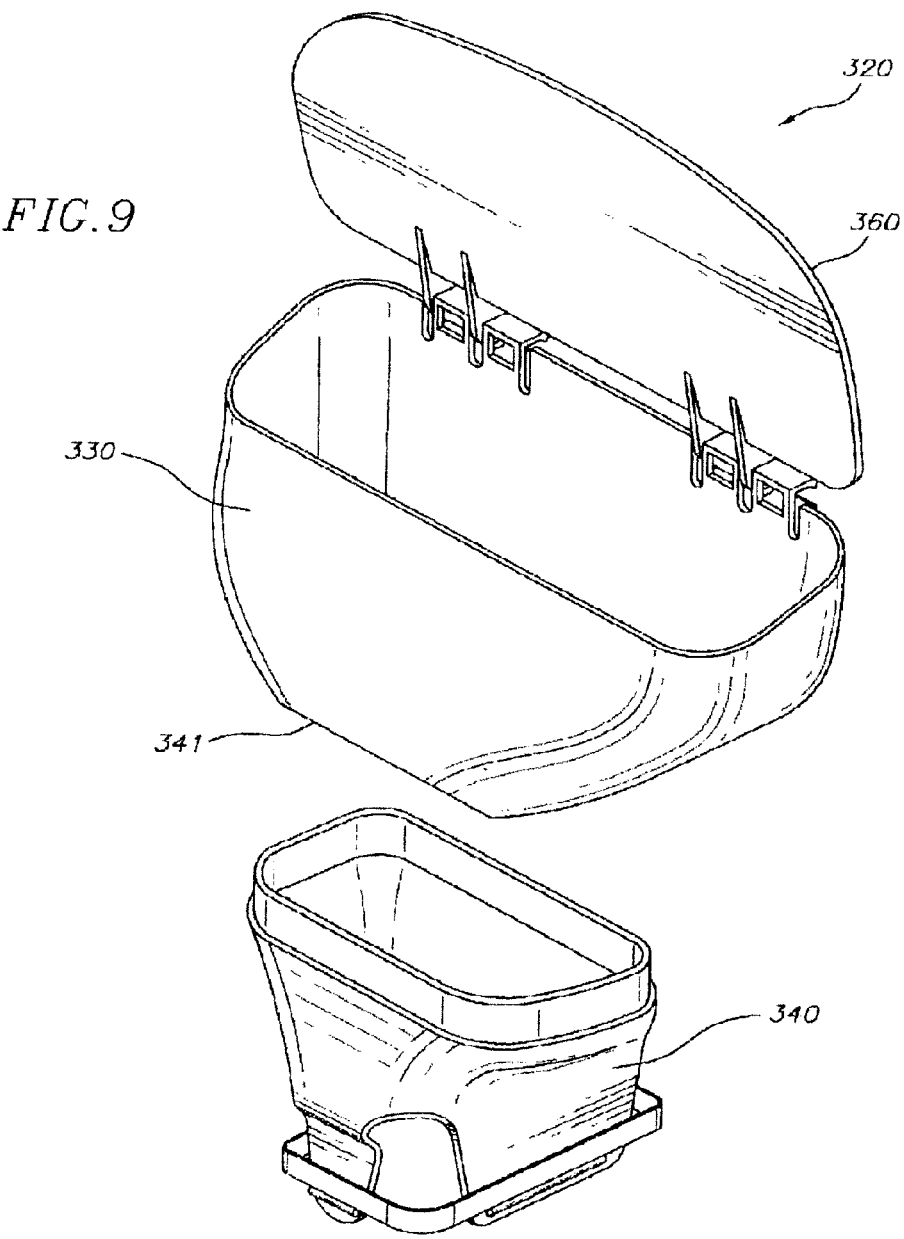

PORTABLE PHOTOGRAPHIC DIFFUSER

CROSS-REFERENCE TO RELATED APPLICATION(S)

This application claims the benefit of U.S. Provisional Patent Application Ser. No. 60/903,124, filed Feb. 23, 2007 and entitled PHOTOGRAPHIC DIFFUSER, the entire content of which is hereby expressly incorporated by reference.

FIELD OF THE INVENTION

The present invention relates to photographic light diffusers and more particularly to portable light diffusers having compound geometry and separable components.

BACKGROUND

Diffuse lighting accessories are photography devices commonly used to provide soft lighting effects in photographs. To achieve a diffuse lighting effect, light can be either directly or indirectly passed through a semi-transparent material, or it may be reflected off a material which will cause it to scatter somewhat. Such diffuse lighting is commonly produced by light sources which are remote from the camera. Typically, such light diffusers are provided by stationary screens, umbrellas, soft boxes and the like. Such devices provide excellent lighting effects in fixed studio settings where there is no need to transport the lighting equipment including the diffusers from place to place.

Each particular shot to be lighted dictates the type and intensity of light needed to properly illuminate the subject. In some situations direct light from a light source without any alteration may be required. In other situations direct lighting may be too strong or cast overly distinct shadows, in which case a more diffuse light is desirable. In still other cases, an even more indirect diffuse light may be needed to create the proper lighting effect. It is important to have a certain amount of uniformity in the lighting used to illuminate the subject. This uniformity may be achieved using typical stationary diffusers provided that the equipment is of good quality and is employed in the proper fashion.

While the equipment described above provides good lighting effects in a fixed studio setting, it can be inconvenient if not impossible to use such stationary lighting accessories outside of the photography studio. For shoots which require the photographer to be mobile, especially shoots where the photographer must capture action shots or cannot otherwise pose his subject, a small portable diffuser may be used which attaches directly to the camera itself. Such a light diffuser may be placed directly over an on-camera flash to provide a semi-transparent barrier to clear light transmission. Known diffusers exist which are small and portable with the camera and flash itself, and these diffusers are used by photographers in shoots where it is impractical to employ fixed lighting equipment. However, known portable diffusers for use with on-camera flashes are less than ideal in terms of the quality of lighting produced. These diffusers tend to create hotspots and may also leave noticeable, undesirable shadows.

SUMMARY OF THE INVENTION

In an embodiment, a photographic light diffuser is provided made from a translucent thermoplastic such as polypropylene or vinyl. In a further embodiment, the photographic light diffuser is made from flexible polyvinylchloride. The photographic light diffuser may be mounted directly to the head of an on-camera flash unit. The diffuser has a generally "whale-tail" shaped body which produces a soft, highly diffused and flattering light quality. The diffuser in one embodiment also includes a flap with a flat surface to add an amount of specular or focused light. Because of the tapered shape of the body of the diffuser, regardless of whether shots are taken in the vertical or horizontal position or under high or low ceilings the diffuser produces the same soft, flattering light quality. The present diffuser allows a photographer to achieve studio-quality lighting and greatly minimize shadows while providing a desirable light balance. In another embodiment, the diffuser is provided with an opening in the back surface that is normally covered with a movable reflective flap which helps to diffuse light even further.

In another embodiment, a photographic light diffuser comprises a semi-transparent cowl which is adapted to be mounted on a photographic light source, the cowl including an opening through which the photographic light source is visible when the cowl is mounted thereon, and has a movable flap mounted on the cowl.

In a further embodiment, a photographic light diffuser which is adapted to be mounted on a photographic light source comprises a base of a shape adapted to be mounted on a light source, and a body extending from the base having contact arms that grip a flash unit.

In yet another embodiment, a camera flash system comprises a camera flash unit, and a diffuser unit having mounting flaps and a whale-tail shaped body. The mounting flaps are formed to match the shape of the housing of the camera flash unit so that it may be fitted thereto using a band to hold them to the flash. The mounting flaps extend between the camera flash unit and the whale-tail shaped body of the diffuser unit.

In an additional embodiment, a photographic light diffusing device includes an at least partially transparent cowl adapted to be mounted on a photographic light source. The cowl includes a plurality of ribs and an opening through which the photographic light source is visible when the cowl is mounted on the photographic light source. The photographic light diffusing device can include a flap, where the flap is movable to at least partially fill the opening. The flap may be approximately the same size and shape as the opening and removable and/or movable, and may extend from the top rear surface of the cowl. The cowl may be tinted and made from a flexible transparent material, and may include a flexible base adapted to fit on a plurality of different photographic light sources. The base of the cowl may include a plurality of contact arms adapted to grip the photographic light source.

In another embodiment, the photographic light diffusing device includes an at least partially transparent cowl adapted to be mounted to a photographic light source. The cowl includes a base including a socket adapted to be mounted to the photographic light source. A tapered body with an opening opposite the base through which the photographic light source is directly visible when the base is mounted to the photographic light source. The photographic light diffusing device may include a movable flap adapted to fit over the opening. The flap may be removable and shaped like the opening of the cowl. The tapered body of the cowl may be generally a whale-tail shape. The cowl may be formed of a flexible transparent material and may include a plurality of ribs.

BRIEF DESCRIPTION OF THE DRAWINGS

FIG. 8A shows a side elevation view of a diffuser according to another embodiment of the invention;

FIG. 8B shows a rear perspective view of a diffuser according to an embodiment of the present invention;

FIG. 9 shows a perspective view of an alternative embodiment of the photographic light diffuser;

DETAILED DESCRIPTION

The present photographic flash diffuser provides high quality lighting effects when used with on-camera flashes, allowing photographers to achieve studio-quality lighting using electronic on-camera flashes without the need for separate lighting equipment. By doing so, the present diffuser does away with needing to carry around and use cumbersome lighting equipment such as brackets, umbrellas, soft boxes and the like, allowing for truly mobile, spontaneous photography.

Figure 1:
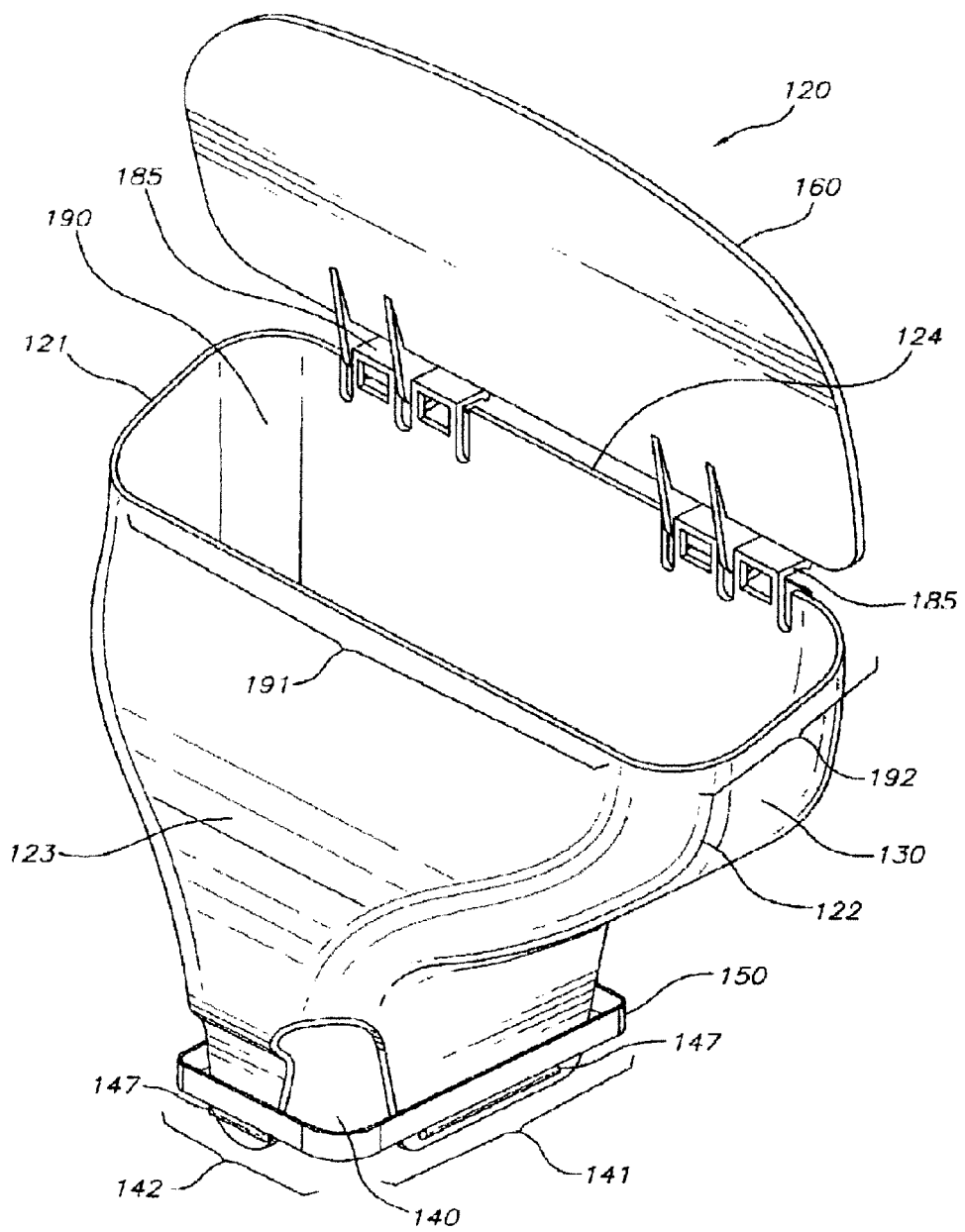
FIG. 1 shows a perspective view of a photographic light diffuser according to one embodiment of the present invention.

FIG. 1 shows a perspective view of a photographic light diffuser 120 according to one embodiment of the present invention. The general shape of the diffuser 120 may be described as that of a whale's tail, which has two horizontal flukes. A substantially rectangular opening 190 at the top allows light to exit after it has been diffused. This diffuser 120 may in one exemplary embodiment be formed from plastics using a vacuum molding process. It may also be made from other molding and non-molding plastic forming processes, as well as being formed from other appropriate semi-transparent or translucent materials as will be understood by one skilled in the art. The mold surface may be roughened to provide the diffuser 120 with a semi-transparent or translucent finish. This roughened surface may be created by treating the mold with a sand or bead blasting process. In one embodiment, the diffuser 120 may be formed having two separable parts. However, in an alternative embodiment, the diffuser 120 may be formed as a single piece having roughly the same overall shape as the embodiments shown.

As shown in the embodiment of FIG. 1, the diffuser 120 is provided having two component parts; a cowl 130 and a movable flap 160. The cowl 130 is provided with a generally rectangular base 140 comprising four contact arms 145 allowing it to attach directly to the head of an on-camera flash unit. In one embodiment, the generally rectangular base 140 may be friction fitted to the head of the on-camera flash unit. In alternative embodiments, the generally rectangular base 140 of the diffuser 120 may be mounted on the flash unit using a bracket permanently or removably attached to the flash unit, or it may be mounted using a threaded collar, a bayonet style mount, using Velcro 150 (as shown), an elastic band, or by other appropriate methods known to those skilled in the art. In another embodiment, the contact arms include ridges 147 to keep a band 150 from sliding off.

In an embodiment, the movable flap 160 is connected to the rear surface of the cowl using hinge clips 185. These clips are molded into the rear surface, but the movable flap 160 may be attached using other methods known to those skilled in the art.

Figure 2:
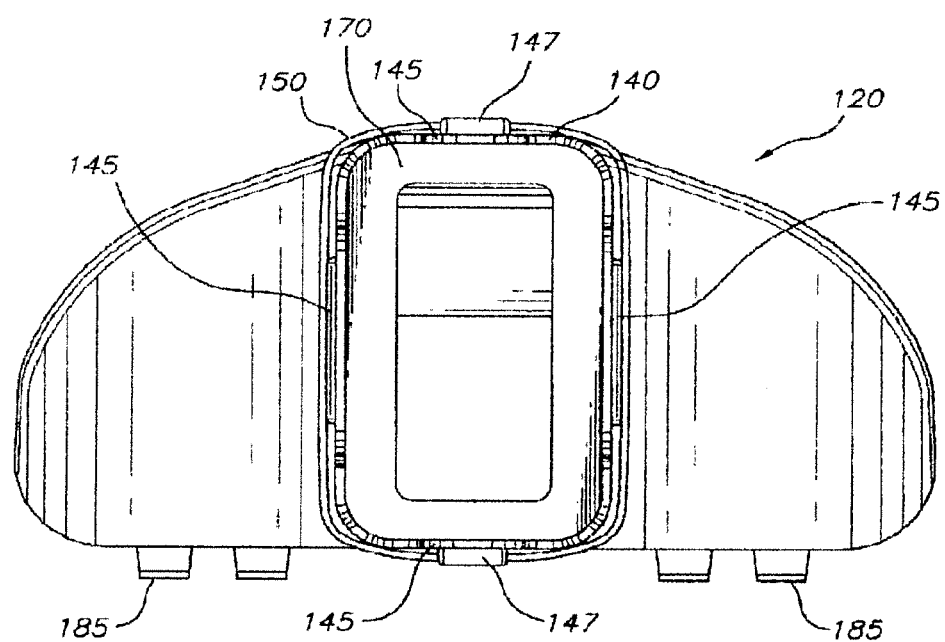
FIG. 2 shows a bottom view of the photographic light diffuser of FIG. 1.
Figure 3:
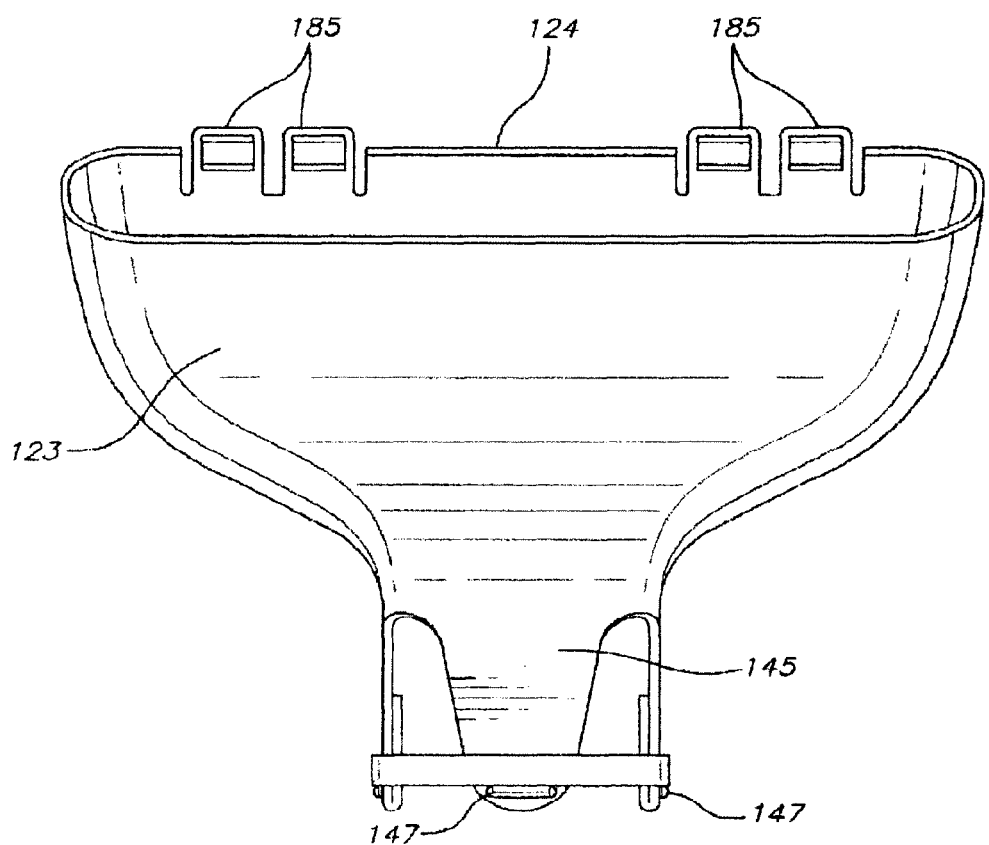
FIG. 3 shows a front view of photographic light diffuser of FIG. 1.
Figure 7:
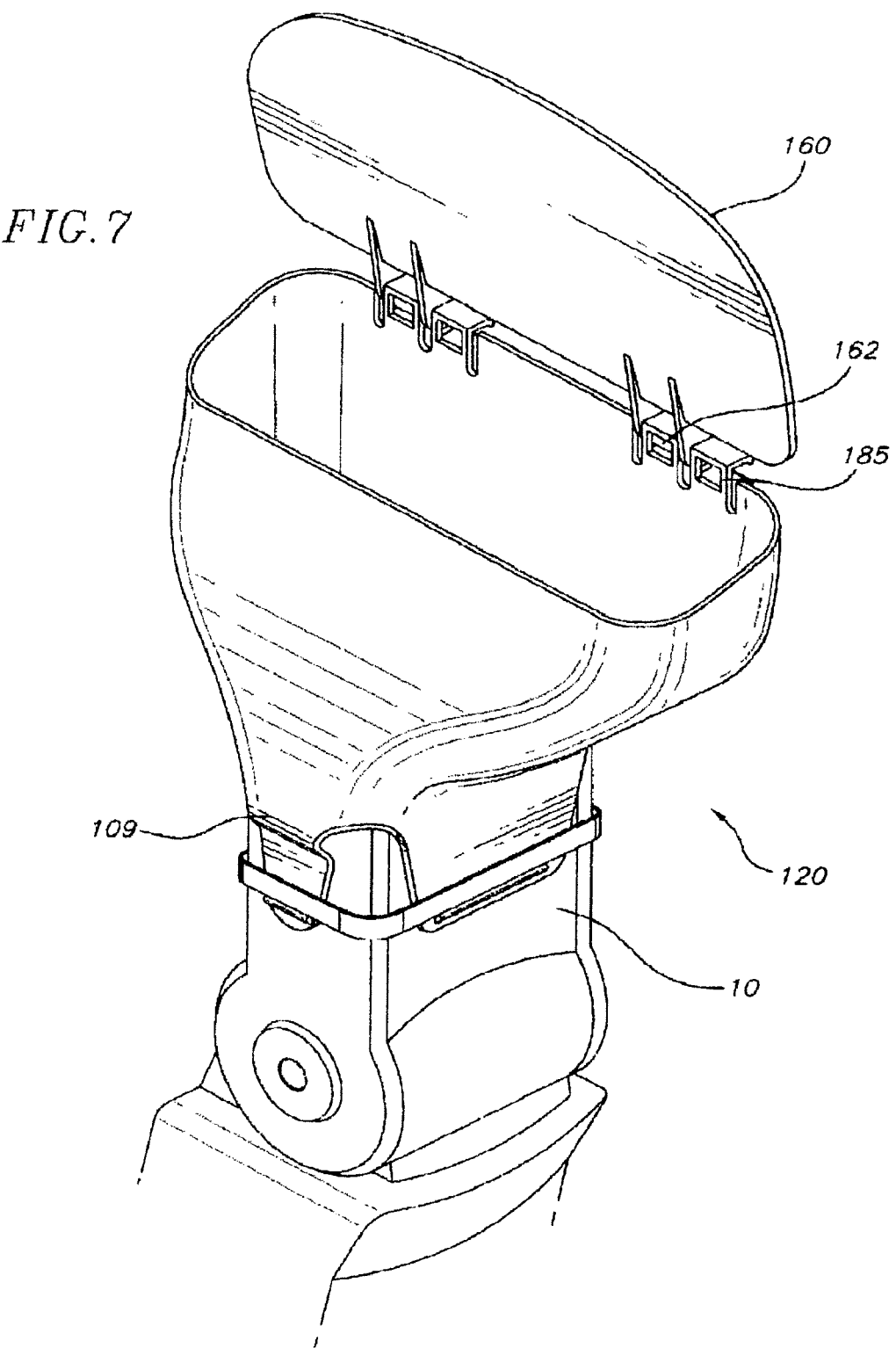
FIG. 7 shows a perspective view of the photographic light diffuser atop a flash head.
Figure 84:
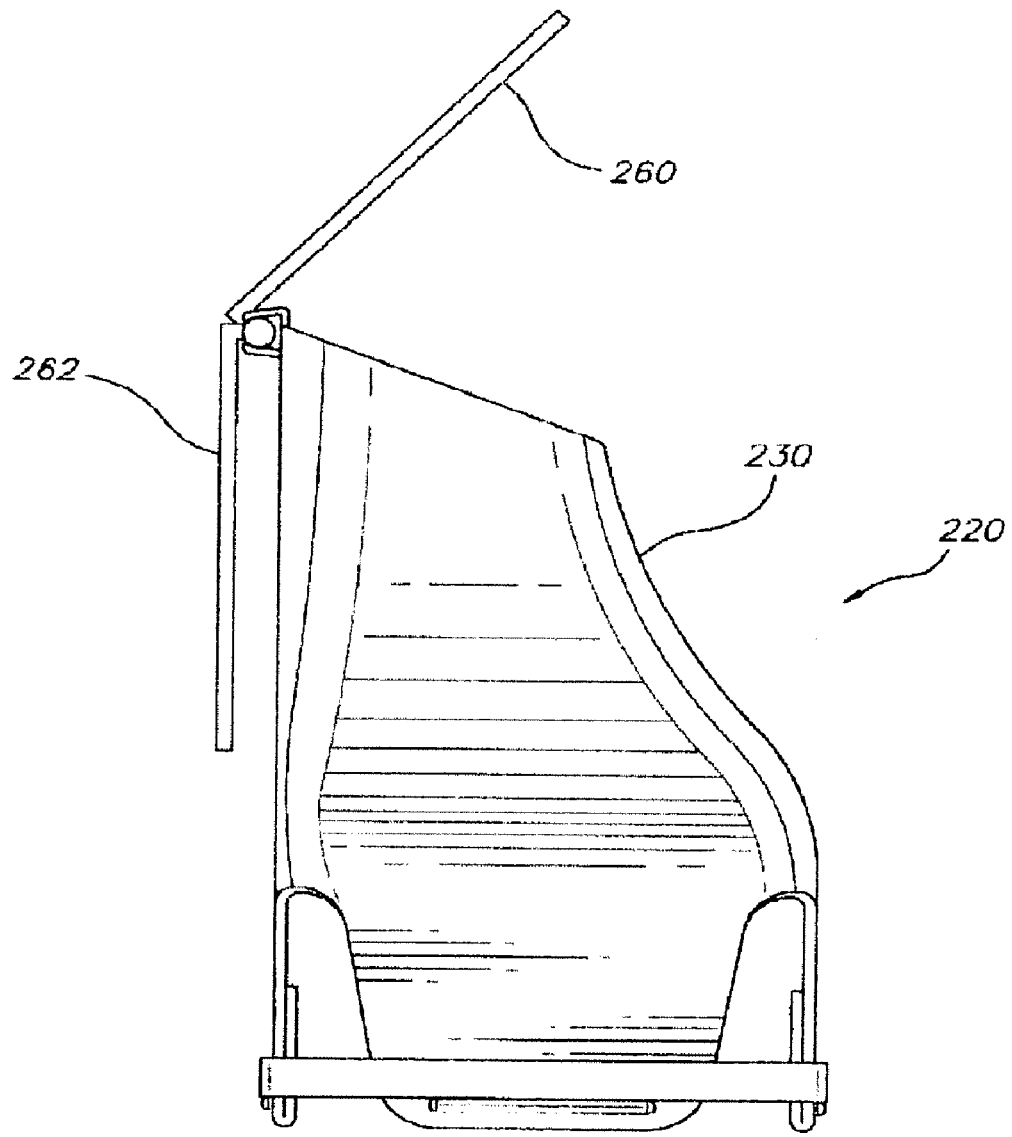
Figure 10A:
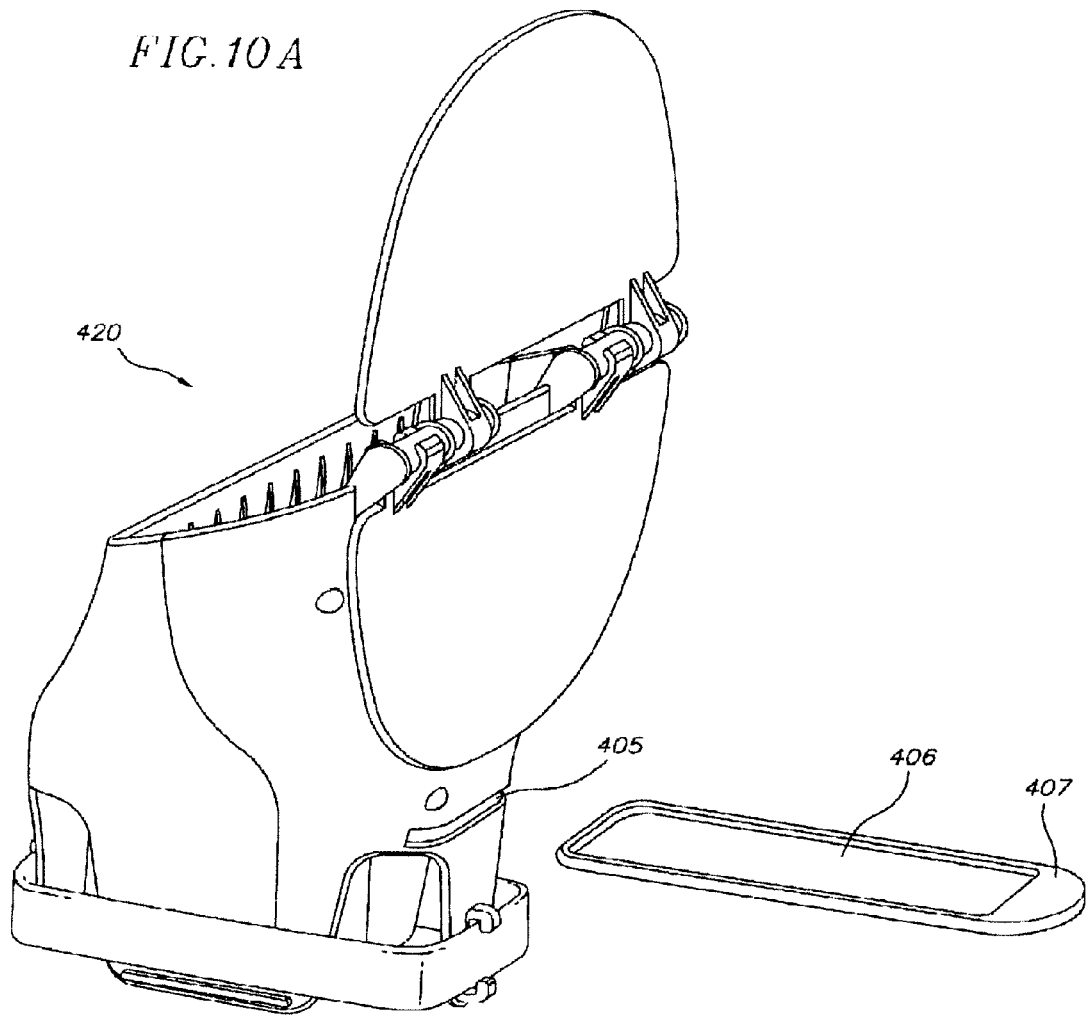
FIG. 10A shows a perspective rear view of an embodiment of the photographic light diffuser.
Figure 10B:
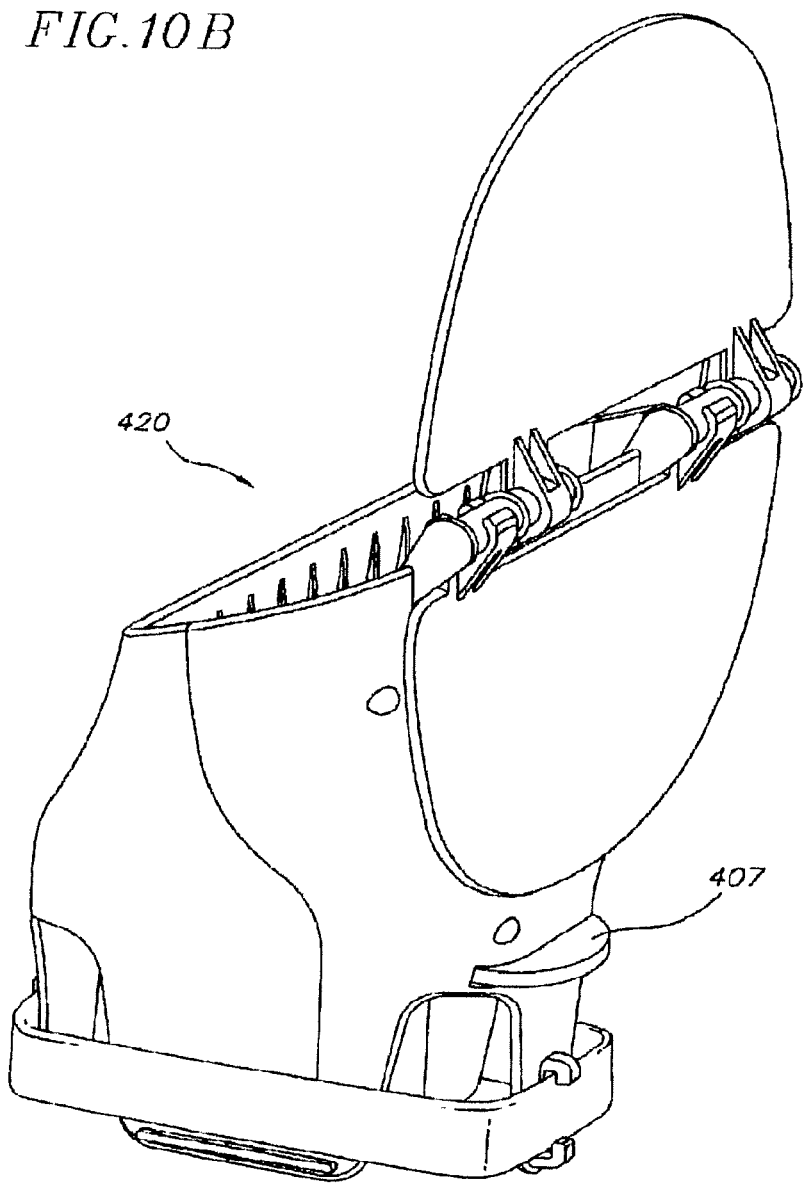
FIG. 10B shows a perspective side view of an embodiment of the photographic light diffuser.
Figure 10C:
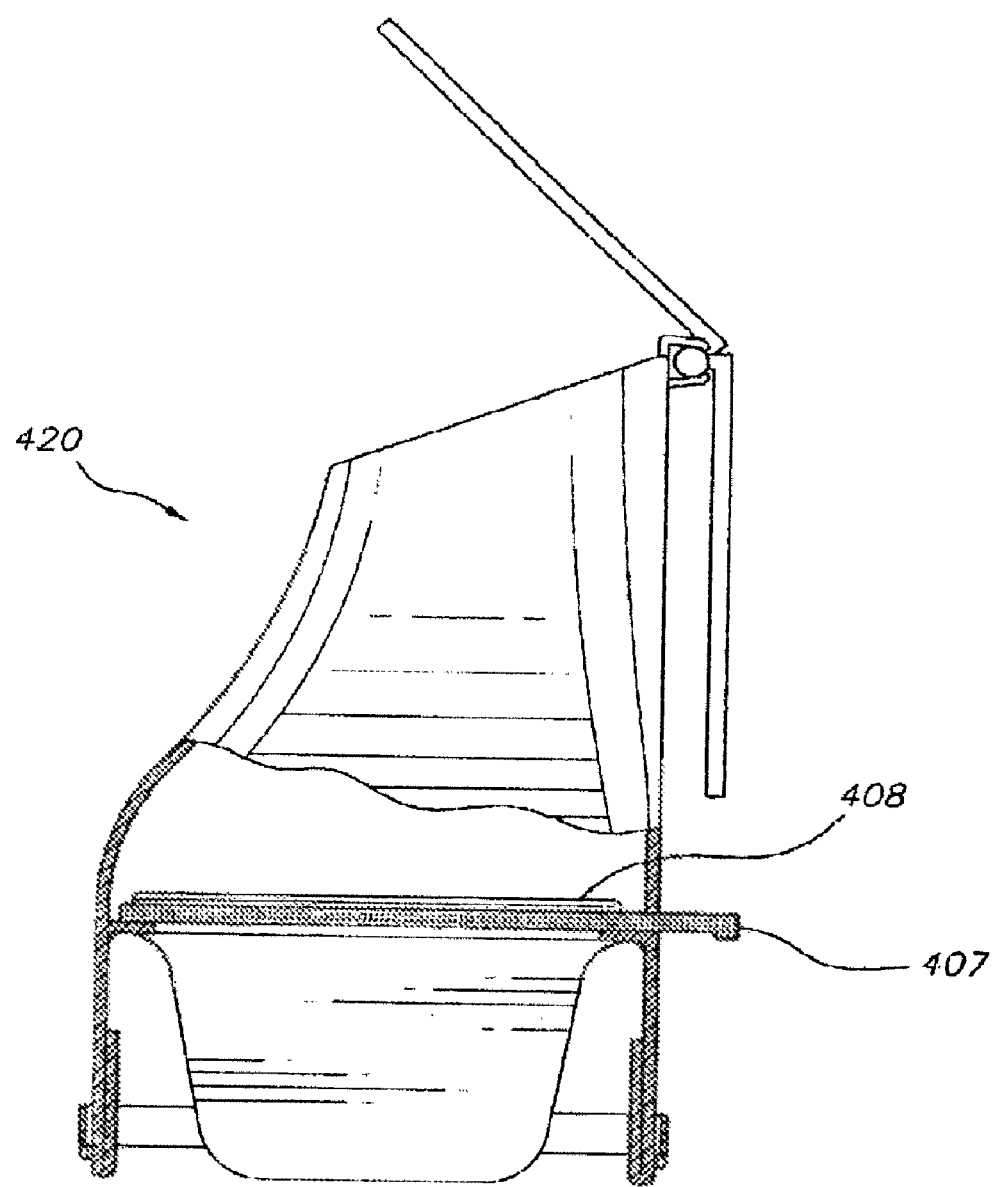
FIG. 10C shows a side elevation view of an embodiment of the photographic light diffuser.
Figure 10D:
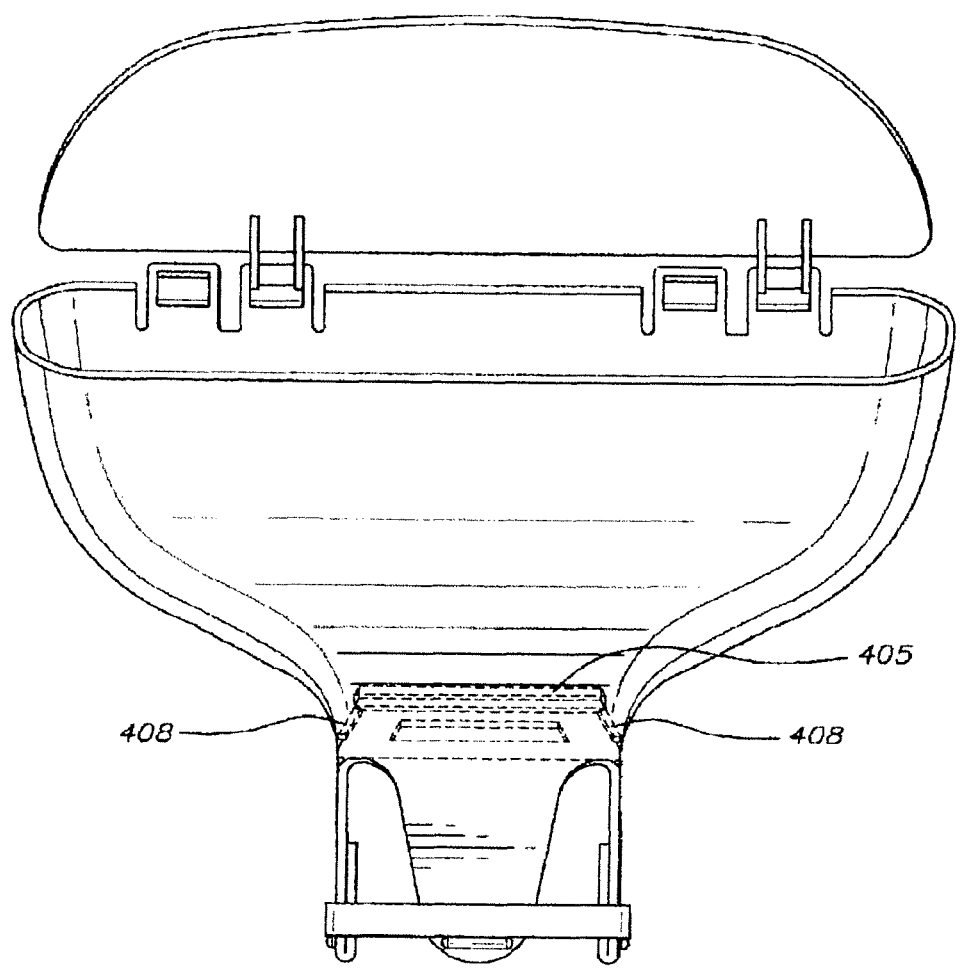
FIG. 10D shows a rear elevation view of an embodiment of the photographic light diffuser.

FIG. 2 shows a bottom view of the photographic light diffuser 120 of FIG. 1. FIG. 2 illustrates that the generally rectangular base 140 with contact arms 145 of the present diffuser 120 may be provided with a basal socket 170 of specific interior dimensions in order to match the exterior dimensions of standard camera flashes. This particular embodiment of a basal socket is designed to be friction fit to a Canon 580EX flash unit. Because the base contact arms 145 are flexible, other flashes of similar dimensions may be used with a band 150 to secure the base contact arms 145 to the flash. In one embodiment, as shown in FIG. 7, the top of the control arms have a bulge 109, which acts as a "spring" to allow a larger flash to be used, yet still allows a tight grip with a smaller flash. The bulge 109 may be on any of the control arms. In one embodiment bulges are on the front and rear control arms. Additionally, other basal sockets may be configured for a friction fit with other models of camera flash units.

Returning to the diffuser 120 of FIG. 1, in an exemplary embodiment the base contact arms 145 extend past a minimum length of about one inch to permit the base to fit over a flash unit, as well as to provide a generally rectangular base 140 between the flash unit itself and the body of cowl 130 of the diffuser 120 through which light from the flash travels.

Accordingly, the lighting properties of the diffuser 120 can be varied by varying the relative proportions of the diffuser 120, specifically the length and breadth of the passage through the generally rectangular base 140 with respect to the size of the whale tail shaped body 130 of the diffuser 120. A shorter passage and a larger tapered body would cause the diffuser 120 to provide less of a direct and more of a diffused lighting effect. Conversely, a relatively longer passage and smaller tapered body would affect the balance of the lighting effect created by the diffuser 120 in the opposite manner.

While the purpose of the diffuser 120 is to ameliorate the harsh effects of direct lighting, some amount of direct light, or "key light" is desirable to provide an amount of specularity in an exposed image. The higher intensity gives a catchlight to the eyes of photographic subjects and prevents the image from appearing too soft. The compound geometry in the present diffuser 120 is designed to strike a balance between an image that is too harsh and one that is too soft.

Figure 4:
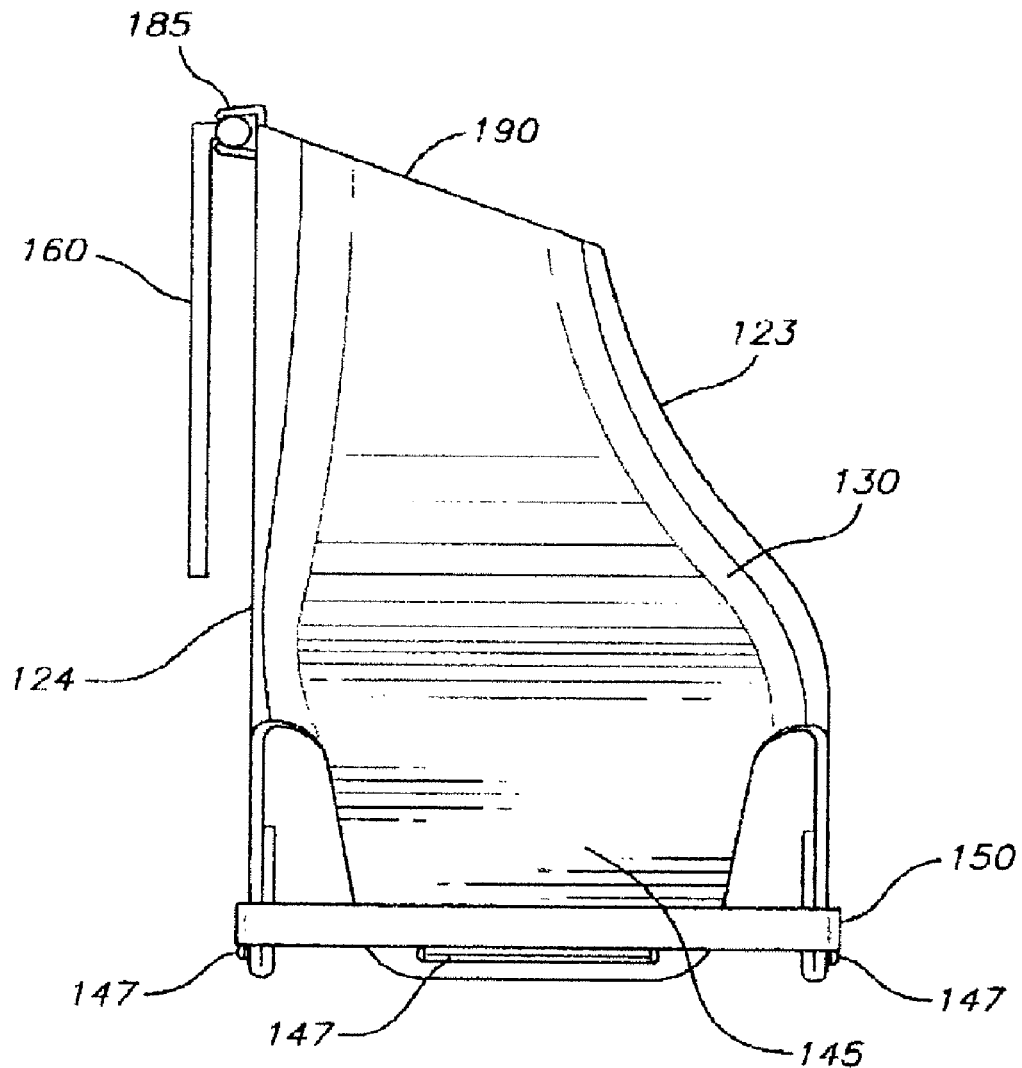
FIG. 4 shows a side view photographic light diffuser of FIG. 1.
Figure 5:
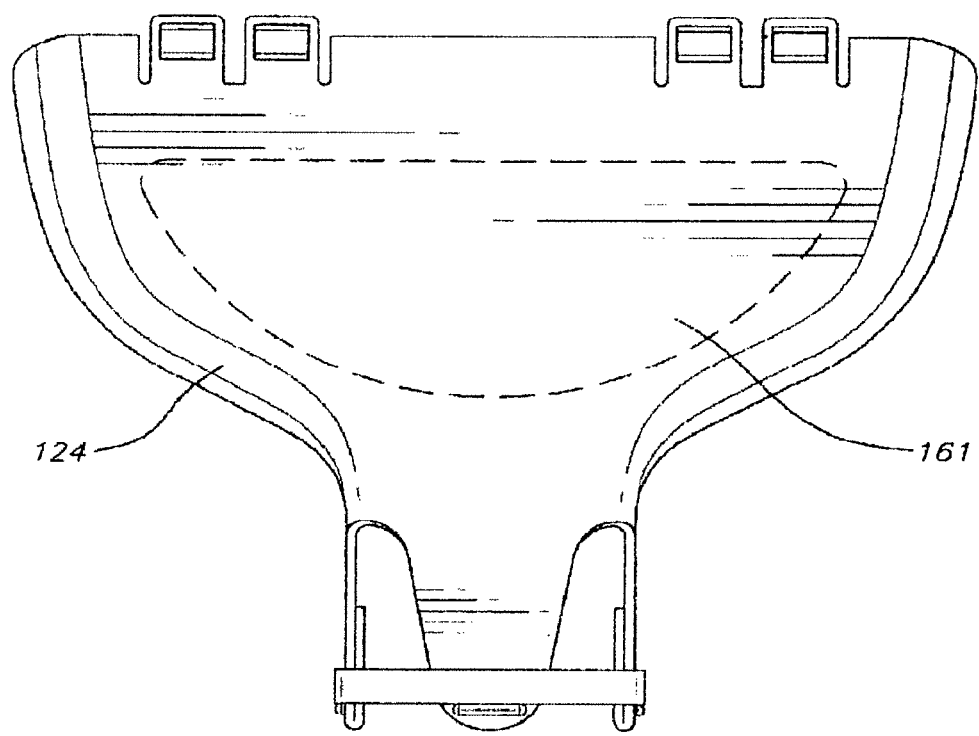
FIG. 5 shows a rear view of the photographic light diffuser of FIG. 1.
Figure 6:
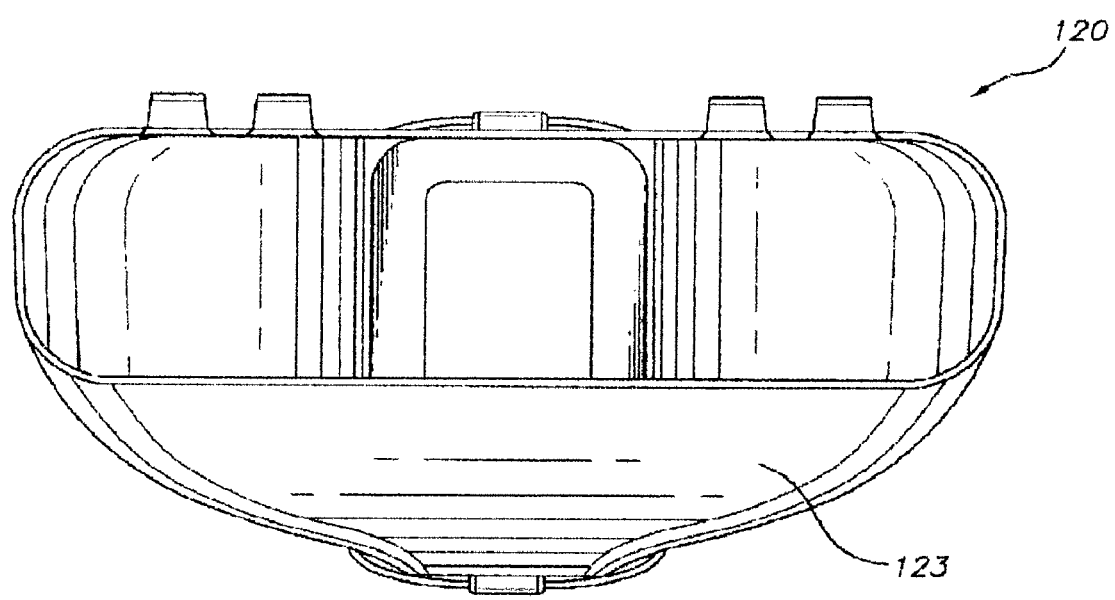
FIG. 6 shows a top view of the photographic light diffuser of FIG. 1.

As shown in FIG. 1, the rectangular base of the diffuser 120 melds seamlessly into the cowl 130, which helps to reduce hot spots and smoothly transitions the light distribution of the diffuser 120 from the more direct light of the rectangular base to the more diffuse light provided by the cowl 130. The side view of the diffuser 120 as seen if FIG. 4, also shows a cowl 130 with the generally rectangular base 140 with contact arms 145. To this cowl 130 is connected the movable and or removable flap 160.

Returning now to FIGS. 1-4, an exemplary embodiment of the present diffuser 120 is shown wherein the cowl 130 includes a base portion 140 with a first opening with a long axis 141 and a short axis 142 adapted to mount on a photographic light source, and a second opening 190 with a long axis 191 and a short axis 192 through which the photographic light source is visible when the cowl is mounted on the photographic light source. The second opening long axis 191 oriented substantially perpendicular to the direction of the first opening long axis 141, the cowl having first 121, second 122, third 123, and fourth 124 sides. The first 121 and second 122 sides of the cowl are opposite each other and taper from the short axis 192 of the second opening to the long axis 141 of the first opening. In one embodiment, the taper of the first and second sides is a curve and in another embodiment it is a more linear taper. The third side 123 of the cowl is located between the first 121 and second 122 sides and tapers from the short axis 142 of the first opening to the long axis 191 of the second opening. In one embodiment, the taper of the third side 123 is a curve and in another embodiment it is a more linear taper. The fourth side 124 of the cowl is located opposite the third side 123 of the cowl. In one embodiment, the fourth side 124 does not taper. In another embodiment, the fourth side 124 tapers from the short axis 142 of the first axis opening to the long axis 191 of the second opening.

In an embodiment, the body 130 of the diffuser 120 flares out as it extends away from the rectangular base. This flared shape, helps to further reduce the hot spots which would otherwise occur as the light energy from the flash strikes the nearer parts of the body 130 with greater intensity than the farther, reducing the diffuse effect otherwise created by the body 130. While some direct lighting effect is desired as discussed above, it can be provided more evenly and reliably by the generally rectangular base 140, and as such it is desirable in the embodiment shown to emphasize the diffuse lighting function of the body 130 at the expense of the direct lighting function by the base 140. With the present diffuser 120, the softness of the lighting effect produced comes as much if not more so from the shape of the diffuser 120 itself and especially the manner in which light is evenly refracted through the surface of the body 130 as from the dispersal of light around the room, including light reflected by the walls and ceilings.

In one embodiment, the body 130 of the diffuser 120 allows it to provide similar lighting effects when used in either the vertical or horizontal positions, regardless of its orientation. Accordingly, unlike prior art diffusers, no flash bracket is needed with the present diffuser 120 to keep the flash in an upright position during both vertical and horizontal photography. In alternative embodiments, the body 130 of the diffuser 120 may form an ellipse in cross section, or one of a set of n-sided polygons. In still other embodiments, the body 130 may be longer or shorter than is shown in the figures, or may be of an other shape such as a non-tapered shape. In one embodiment, the height and width of the diffuser are about equal to one another. In yet another embodiment, the diffuser is proportioned so that it is easy to pack and transport in that it may be placed over the camera's lens when packed together with a camera in a standard camera/gadget bags, thus saving space. For example, the cowl 130 of the diffuser 120 may be placed directly over the lens of the camera.

In an exemplary embodiment, the present diffuser 120 is convertible for use with both low and high ceilings. To this end, FIG. 1 additionally shows the diffuser 120 provided with a flap 160 which may be removably attached to the cowl 130, and movable with respect to the opening of the cowl, so that the diffuser 120 can be used to provide a less diffuse lighting effect with the flap 160 sending more light forward for direct flash lighting.

When shooting with the diffuser in a vertical position in environments with high ceilings, the cowl 130 may be employed with the flap 160 with removed or in a position such that it doesn't interfere with the light exiting the opening of the cowl 130. In one embodiment, the cowl 130 is provided with an open top which lets light energy from the flash shine upwards to reflect off the ceiling in the absence of the flap 160. Due to the shape and orientation of the cowl 130, enough light strikes the sides of the body of the cowl 130 to cast some amount of light forward onto the subject even without employing the movable flap 160. This gives a great lighting ratio for shots taken with the diffuser in the vertical position, reducing shadows on the subject and giving a diffuse, soft light all around the room as well as on the subject. For large group shots, the lighting quality is soft, beautiful and diffuse. The open top allows a great deal of light to bounce off the ceiling onto the subject yielding a beautiful, natural lighting effect.

The flap 160 is provided for indoor environments with low ceilings where reflected light from the ceiling would cast harsh shadows on the subject. In one embodiment, the flap 160 acts as a diffusion device to spread light evenly all around the room, lighting the subject as well as brightening dark backgrounds and ceilings, The flap 160 may snap directly onto the cowl 130 of the diffuser 120 to accomplish this diffusion. Specifically, FIG. 7 shows a photographic light diffuser mounted on a flash unit 110 with one embodiment of a snap-on system for connecting the flap 160 to the body 130, wherein the former is provided with a bar 162 which Fits over a snap ridge 185 on the latter. Furthermore, the present combination of cowl 130 and flap 160 loses less power than other diffusers, making it more efficient. With the employment of the flap 160 with the diffuser 120 for use with low ceilings, studio-quality lighting using a flash can be achieved with a portable photography platform.

In one embodiment, when it is desirable to directly light a subject, it is not necessary to remove the entire diffuser 120 from the flash unit of the camera. The flap 160 only may be moved to a position away from the top opening of the cowl, and the flash pointed directly at the subject through the open top of the cowl 130 which remains attached to easily and directly illuminate the subject.

On occasion, photographers will want the reflected light in their shots to have a particular color quality. This can be provided with alternative embodiments of the present diffuser wherein the material of the entire diffuser itself, or specific portions of the diffuser such as the cowl or the base are formed having a particular hue. For example, the flap 160 can be made amber for inside shots to provide warmer skin tones and for overall warming in flash filled available light shots, and green for shots where there is a good deal of florescent lighting.

FIG. 8A shows a side elevation view of a diffuser 220 with a first movable flap 260 and a second movable flap 262. In one embodiment, the first movable flap 260 is opaque and operates to bounce light from the top opening of the cowl 230. In another embodiment, the second movable flap is reflective, and adds additional light power toward the front of the diffuser 220 and out the top opening.

FIG. 8B shows a rear perspective view the diffuser 220 with an optional opening 261 in the rear surface. In one embodiment, when the second flap 262 is in the downward position as shown, more flash power is projected forward and out of the top opening of the diffuser 220. If less flash power is desired, the second flap 262 may be rotated up and away from the opening 261, thereby allowing light to escape out the back of the diffuser 220. Additionally, if the photographer has a rear wall nearby, the lifting of the second flap 262 would allow the rear wall to act as a bounce surface.

In one embodiment, ribs 208 extend along an inside surface in the body portion of the cowl 230. The ribs can extend vertically, following the contour of the cowl 230 (shown), or, they can extend around the circumference of the body portion of the cowl 230 (not shown). The ribs 208 can also extend on an outer surface of the cowl 230. The ribs 208 allow light to be more effectively diffused as it passes through the cowl 230 and into the area in which a photograph is being taken.

FIG. 9 shows a perspective view of an embodiment of a diffuser 320 with a movable flap 360 in which the cowl 330 is removable from a base adaptor 340. This allows the use of different diffuser attachments that are designed to fit the base adaptor 340, without having to remove the base adapter 340 each time a new diffuser is desired.

In one embodiment, the diffuser 320 can be formed from any suitable material. For example, the diffuser can be formed of a vinyl material which is capable of stretching. The vinyl used to form the diffuser 320 can be clear and bead blasted, which allows for greater dispersion of light through the diffuser. In one embodiment, a variety of flash units having different shapes can be inserted into the cowl 330 without the need to use the base adaptor 340. The bottom opening of the cowl 341 stretches to fit many flash units of various manufacturers, which are placed into the cowl 330 as described above.

In another embodiment as shown in FIGS. 10A-D, the diffuser 420 may have a filter slot 405 located above the location where a flash is installed. The filter slot 405 may be located on the rear surface of the diffuser 420 as shown, or on the side surfaces or the front surface. The filter slot 405 is dimensioned to accept a filter 406. In one embodiment, the filter 406 is a slideable filter. In another embodiment, the slot has a rail 408 on each side which allows the slideable filter 406 to be installed with sliding motion. The rails 408 may also keep the forward end of the slideable filter 406 from falling into an installed flash unit (not shown). The filter 406 may be a gel filter. By changing the tint of the filter 406, different lighting conditions may be created. In one embodiment, the filter 406 has a tab 407 that remains outside of the diffuser 420 after the filter has been fully inserted into the filter slot 405. For example, an amber gel filter may warm up the lighting in the room; however, any color filter may be used.

While this invention has been described in connection with what are considered to be exemplary embodiments, it is to be understood that the invention is not limited to the disclosed embodiments, dimensions, and configurations but, on the contrary, also extends to various modifications and equivalent arrangements. The invention is limited only by the claims and their equivalents.

What is claimed is:

1. A photographic light diffusing device comprising:
a cowl comprising a body having a first opening, a second opening substantially opposite to the first opening, a plurality of integral side walls, and a base portion extending from the body and defining a cavity, wherein the base portion comprises a plurality of contact arms adapted to grip different sized photographic light sources, a first contact arm of the contact arm being oriented in a direction generally perpendicular to an orientation of an adjacent second contact arm of the contact arms, wherein a side edge of the first contact arm extending in a first direction is spaced along its entire length from a side edge of the second contact arm extending in the first direction, wherein at least one of the plurality of contact arms comprises a bulge protruding away from the cavity and adapted to act as a spring so that differently sized photographic light sources are mountable within the plurality of contact arms, and wherein the cowl and the contact arms comprise the same material; and
a movable flap rotatably coupled to the body and configured to be able to cover the first opening on the cowl.

2. The photographic light diffusing device of claim 1, further comprising a flexible band around an exterior of the plurality of contact arms.

3. The photographic light diffusing device of claim 2, wherein each of the plurality of contact arms further comprises a ridge adapted to prevent the band from sliding off of the plurality of contact arms.

4. The photographic light diffusing device of claim 2, wherein the band comprises VELCRO®.

5. The photographic light diffusing device of claim 2, wherein the band comprises elastic.

6. The photographic light diffusing device of claim 1, wherein the plurality of contact arms comprises two longitudinal contact arms opposite to each other and parallel to a long axis of the base portion, and two lateral contact arms opposite to each other and parallel to a short axis of the base portion and wherein the longitudinal contact arms are wider than the lateral contact arms.

7. The photographic light diffusing device of claim 1, wherein the base portion is adapted to be mounted to the photographic light source with a friction fit.

8. The photographic light diffusing device of claim 1, further comprising a diffusing portion, wherein the base portion comprises an opening adapted to receive the diffusing portion so that the diffusing portion is removable from the base portion.

9. The photographic light diffusing device of claim 1, wherein an entirety of the cowl comprises a single, semitransparent material.

* * * * *

UNITED STATES PATENT AND TRADEMARK OFFICE
CERTIFICATE OF CORRECTION

| | | |
|---|---|---|
| PATENT NO. | : 8,201,955 B2 | Page 1 of 1 |
| APPLICATION NO. | : 11/873359 | |
| DATED | : June 19, 2012 | |
| INVENTOR(S) | : Gary Fong | |

It is certified that error appears in the above-identified patent and that said Letters Patent is hereby corrected as shown below:

In the Claims

Column 8, Claim 1, line 5    Delete the second occurrence of "arm"

Insert -- arms --

Signed and Sealed this
Fourth Day of December, 2012

David J. Kappos
*Director of the United States Patent and Trademark Office*